Figure 1:
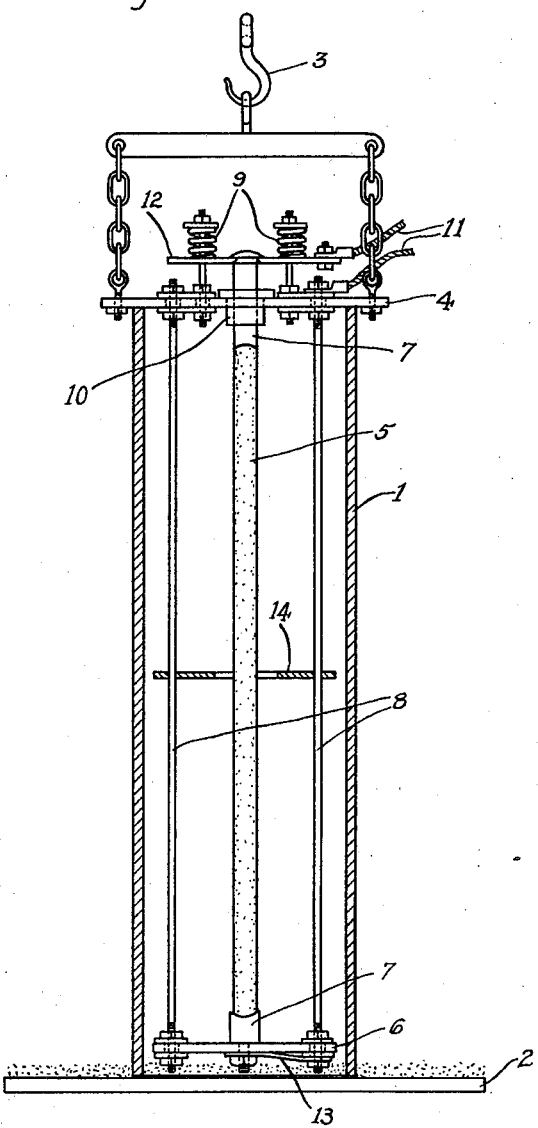

Patented Aug. 23, 1932

1,873,535

UNITED STATES PATENT OFFICE

BARTLEY E. BROADWELL, OF LEWISTON, NEW YORK, ASSIGNOR TO THE REPUBLIC CARBON COMPANY, OF NIAGARA FALLS, NEW YORK, A CORPORATION OF DELAWARE

METHOD OF HEATING MOLDS FOR MOLDING THERMO-PLASTIC MATERIALS

Application filed October 8, 1930. Serial No. 487,224.

This invention relates particularly to an improved method of heating molds for the production of electrodes by the methods of tamping, molding or jolting but is applicable to the molding of any materials in which it is desirable to heat the mold previous to the introduction of the material to be molded.

Prior to my invention it has been customary to use jacketed molds so constructed that a heated fluid such as steam is passed through chambers surrounding the mold proper. Such a mold is shown in U. S. Patent No. 1,683,587 to Doerschuk over whose process my invention constitutes an improvement. The nature of these molds makes their manufacture very expensive, and their weight and added bulk makes them cumbersome to handle. Also in the jolting process mentioned above, the severe shock imparted makes it desirable to use molds as simply constructed as possible in order to prevent cracking.

It is also possible to preheat the molds in ovens or furnaces but this is disadvantageous as the construction of furnaces large enough to accommodate the molds is expensive, a comparatively large area of floor space is involved and the handling of the molds in placing them in and removing them from the heating chambers is mechanically difficult. Also the large heat capacity of ovens and the fact that it is difficult to operate them intermittently makes the operation inefficient for anything but very steady production.

To avoid the difficulties above mentioned, I have found that it is practical and desirable to heat the mold by inserting therein or applying thereabout a heating device, for example, a gas fired heating unit or an electrical resistor made from resistance wire or other suitable material such as silicon carbide. While the description and illustration given below indicate a silicon carbide resistor for insertion within the mold, this is given by way of illustration only and is not intended to limit the scope of my invention, which applies to any form of readily portable heating unit applied within or immediately surrounding the mold to be heated, which heating device does not form an integral or permanent part of the mold.

The silicon carbide resistor is preferred because of its small heat capacity which accelerates its rate of heating and decreases the loss of heat stored in the heater at the end of its period of use, also because of the fact that it operates at high temperatures up to 1400° C.—yielding its heat in the form of radiant energy which is rapidly transmitted to and absorbed by the mold. This form of heater is also particularly adapted for use with molds having much greater length than diameter.

Fig. 1 shows a sectional view through the center of a mold equipped with a "Globar" type heating element with the latter in operating position.

The following description is given by way of illustration. In carrying out the preheating process the mold 1 is placed on a level plate or other support 2 which may, if desired, be covered by sand or other suitable material to prevent denting of the end of the mold and to form a seal preventing convection of air through the mold. The heating unit and its connections are then set in place by means of a crane carrying a hook 3.

The heating unit hangs on a cover plate 4 which supports the heating element and also serves to cover the top of the mold during the heating operation preventing loss of heat by convection. Centering of the cover and therefore the resistor may be accomplished by any of a number of simple mechanical means.

The heating element is preferably placed co-axially with the mold in order that all sides may be evenly heated and should preferably extend to within a short distance of the ends of the mold.

The resistor 5 is supported from the cover plate by means of a bottom rest 6 which is supplied with a suitable type of contact 7, the bottom rest being hung from the top plate by support rods 8, one or more of which may also be used as a conductor for supplying current to the lower terminal 7. The top terminal 7 is held in place by the collar 10 and springs 9, this combination keeping the resistor properly in line and making low resistance contacts between the element and its terminal connections. As illustrated, the terminal contacts are of a suitable heat resisting alloy or may be of a water cooled construction. The current is supplied through leads 11 and to the lower end of the resistor through the right-hand rod 8, strap 13 and lower terminal 7, and is carried from the upper end of the resistor through connector 12. In molds of such size that convection currents tend to cause uneven heating, baffles 14 may be provided, mounted on the supporting rods 8. In very long molds additional heating resistors can be placed end to end and if for any reason one part of the mold should require more heat than another part, a higher wattage resistor or a plurality of resistors can be used in the part requiring more heat.

In the case of an external heater, the method of operation is very similar to the foregoing. The heating element is mounted within a light cover of thermal insulating material which may be hinged to open down its side or may take the form of a cylinder open at the bottom so that it can be set in place around the mold by means of a crane. It is still desirable that the heater and the mold be placed approximately concentrically, and while this form of heater is somewhat more wasteful of heat than an internal heater, it is still a material improvement over the steam jacketed molds or cumbersome ovens otherwise required.

In general, it has been found that it is desirable to preheat the mold so that its inner surface is originally at a temperature just below that at which the pitch used as a binder in the electrode mix begins to decompose, as in this way the portion of the mix immediately adjacent the mold is heated to a state of maximum mobility, reducing friction to a minimum and facilitating packing of the mix in the mold.

Due to the fact that no steam jacket is required the molds are much cheaper to manufacture, lighter to handle and are less subject to damage. Further, the electrical connections can be permanently attached to the heating element and no time is lost in attaching fittings to the molds. The space occupied by the heating element is extremely small and it may be used within a few feet of the forming apparatus without undue interference with workmen.

I claim:

1. The method of preheating a mold for a thermoplastic mix which comprises inserting a removable heating unit within the mold and within the volume to be occupied by the said mix during molding, heating the mold with the said unit, and withdrawing the heating unit before introducing the mix into the mold.

2. The method of preheating a mold for a thermoplastic mix which comprises operating an electric heating element at incandescent temperatures within the volume of the mold to be occupied by the said mix during molding, heating the mold substantially by radiant heat, and withdrawing the heating element before introducing the mix into the mold.

3. The method of preheating a mold for a thermoplastic mix which comprises inserting a silicon carbide resistor within the mold and within the volume to be occupied by the mix during molding, heating the mold by passing an electric current through the said resistor, and removing the resistor before introducing the mix into the mold.

4. The method of preheating a mold for a thermoplastic mix which comprises inserting a removable electric heating unit within the mold and in a position coaxial with respect to the mold, heating the mold therewith, and withdrawing the heating unit before the introduction of the mix into the mold.

5. The step in the process of molding articles comprising a bituminous binder which step consists in preheating the interior only of a mold to a temperature just below that at which the binder begins to decompose.

6. The method of preheating a mold of substantial thickness before the introduction thereinto of material to be molded, which comprises heating the mold surface which is to contact such material to a higher temperature than the parts of the mold remote from said surface.

In testimony whereof I affix my signature.

BARTLEY E. BROADWELL.